United States Patent
Koga et al.

(10) Patent No.: US 10,058,937 B2
(45) Date of Patent: *Aug. 28, 2018

(54) CUTTING INSERT, CUTTING TOOL, AND METHOD OF MANUFACTURING MACHINED PRODUCT USING THE SAME

(71) Applicant: Kyocera Corporation, Kyoto-shi, Kyoto (JP)

(72) Inventors: Kenichirou Koga, Kyoto (JP); Masahiro Shibata, Kyoto (JP); Kazuki Yamamichi, Kyoto (JP)

(73) Assignee: Kyocera Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,698

(22) Filed: Nov. 22, 2016

(65) Prior Publication Data

US 2017/0197260 A1    Jul. 13, 2017

Related U.S. Application Data

(63) Continuation of application No. 14/113,552, filed as application No. PCT/JP2012/061389 on Apr. 27, 2012, now Pat. No. 9,533,356.

(30) Foreign Application Priority Data

Apr. 28, 2011    (JP) .................................. 2011-101190
Feb. 29, 2012    (JP) .................................. 2012-044134

(51) Int. Cl.
*B23C 5/20*    (2006.01)
*B23C 5/06*    (2006.01)

(52) U.S. Cl.
CPC ................ *B23C 5/207* (2013.01); *B23C 5/06* (2013.01); *B23C 2200/0411* (2013.01);
(Continued)

(58) Field of Classification Search
CPC ....... B23C 2200/0411; B23C 2200/205; B23C 5/207
See application file for complete search history.

(56) References Cited

U.S. PATENT DOCUMENTS 5,695,303 A    12/1997    Boianjiu
5,807,031 A    9/1998    Arai et al.
(Continued)

FOREIGN PATENT DOCUMENTS

DE    102008016732    6/2009
EP    0790094    8/1997
(Continued)

*Primary Examiner* — Alan Snyder
(74) *Attorney, Agent, or Firm* — Volpe and Koenig, P.C.

(57) ABSTRACT

A cutting insert includes: a polygonal shaped upper surface; a lower surface; a side surface connected to each of the upper and lower surfaces; and an upper cutting edge located at the intersection of the upper surface and the side surface. The upper surface alternately includes three major corners and three minor corners. The upper cutting edge includes: a corner cutting edge; a minor cutting edge inclined toward the lower surface as separating from the corner cutting edge at a first inclination angle; and a major cutting edge inclined toward the lower surface as separating from the minor cutting edge at a second inclination angle. The corner cutting edge, the minor cutting edge and the major cutting edge are located sequentially from a first major corner to each of first and second minor corners, both of which are adjacent to the first major corner.

14 Claims, 11 Drawing Sheets

(52) U.S. Cl.
CPC .. *B23C 2200/205* (2013.01); *B23C 2210/045* (2013.01); *B23C 2210/0414* (2013.01); *B23C 2210/0428* (2013.01)

(56) References Cited

U.S. PATENT DOCUMENTS

| | | | |
|---|---|---|---|
| 5,810,521 A * | 9/1998 | Pantzar | B23B 27/145 |
| | | | 407/114 |
| 5,951,212 A | 9/1999 | Emoto et al. | |
| 7,455,483 B2 | 11/2008 | Koskinen | |
| 8,177,460 B2 | 5/2012 | Satran | |
| 8,568,064 B2 | 10/2013 | Carl | |
| 9,533,356 B2 * | 1/2017 | Koga | B23C 5/06 |
| 2001/0051077 A1 | 12/2001 | Negata | |
| 2007/0297865 A1 * | 12/2007 | Hessman | B23C 5/207 |
| | | | 407/114 |
| 2009/0290945 A1 | 11/2009 | Carl | |
| 2010/0080662 A1 | 4/2010 | Satran et al. | |
| 2010/0221076 A1 | 9/2010 | Takahashi et al. | |
| 2011/0070040 A1 | 3/2011 | Park et al. | |
| 2012/0045289 A1 | 2/2012 | Ishi | |

FOREIGN PATENT DOCUMENTS

| | | |
|---|---|---|
| EP | 1157768 | 11/2001 |
| EP | 2022584 | 2/2009 |
| EP | 1931487 | 8/2012 |
| JP | 08-323510 | 12/1996 |
| JP | 09-216113 | 8/1997 |
| JP | 2002-046010 | 2/2002 |
| JP | 2009533235 | 9/2009 |
| JP | 2010-523352 | 7/2010 |
| JP | 20100532271 | 10/2010 |
| JP | 2011-051039 | 3/2011 |
| WO | 200703773 | 4/2007 |
| WO | 2007142224 | 12/2007 |
| WO | 2008120186 | 10/2008 |
| WO | 2010137633 | 12/2010 |

* cited by examiner

CUTTING INSERT, CUTTING TOOL, AND METHOD OF MANUFACTURING MACHINED PRODUCT USING THE SAME

INCORPORATION BY REFERENCE

The following documents are incorporated herein by reference as if fully set forth: U.S. patent application Ser. No. 14/113,552, filed Oct. 23, 2013.

TECHNICAL FIELD

The present invention relates to a cutting insert, a cutting tool, and a method of manufacturing a machined product using the same.

BACKGROUND ART

Conventionally, as a cutting insert (hereinafter referred to as "insert" in some cases) used for performing a face milling process, an insert whose both hexagonal shaped surfaces are usable has been proposed (for example, refer to International Publication No. 2007-037733A1).

However, according to the insert of the International Publication No. 2007/037733A1, a major cutting edge 16 and a minor cutting edge 17 that are located with a corner cutting edge 20 interposed therebetween differ from each other in configuration as shown in FIGS. 1A and 1E thereof. Consequently, three corners of the hexagonal shape are respectively usable only in the same rotation direction (for example, the forward rotation direction), and hence there is a need to separately prepare a reverse rotation insert for ensuring a proper use.

On the other hand, a tip has been proposed which is usable in both the forward and reverse rotations by making both sides of a corner part 4 have the same cutting edge structure (for example, refer to Japanese Patent Unexamined Publication No. 9-216113).

However, according to the tip of the Publication No. 9-216113, a portion 10 of a cutting edge used mainly during a cutting process is inclined in a straight line shape as shown in FIG. 2 thereof. It is therefore difficult to ensure sufficient cutting edge strength in the vicinity of the corner part 4 subjected to a large cutting force during the cutting process, and consequently a fracture may occur there. This is also true for the insert of the International Publication No. 2007/037733A1.

Hence, there is a need for an insert having both low cutting resistance and excellent fracture resistance.

SUMMARY OF THE INVENTION

An object of the present invention is to provide a cutting insert and a cutting tool which have both low cutting resistance and excellent fracture resistance, as well as a method of manufacturing a machined product using the cutting insert and the cutting tool.

A cutting insert according to an embodiment of the present invention includes: a polygonal shaped upper surface; a lower surface being identical in shape to the upper surface; a side surface connected to each of the upper surface and the lower surface; and an upper cutting edge located at an intersection of the upper surface and the side surface. The upper surface alternately includes three major corners, each having a first interior angle, and three minor corners, each having a second interior angle larger than the first interior angle. The upper cutting edge includes: a corner cutting edge; a minor cutting edge inclined toward the lower surface as separating from the corner cutting edge at a first inclination angle on the basis of a vertical plane perpendicular to a central axis extending between the upper and lower surfaces; and a major cutting edge inclined toward the lower surface as separating from the minor cutting edge at a second inclination angle larger than the first inclination angle on the basis of the vertical plane. The corner cutting edge, the minor cutting edge and the major cutting edge are located sequentially from a first major corner of the three major corners to each of a first minor corner and a second minor corner of the three minor corners, both of which are adjacent to the first major corner.

A cutting tool according to an embodiment of the present invention includes the cutting insert of the foregoing embodiment, and a holder configured to attach the cutting insert thereto. A first major cutting section of the upper cutting edge extending from the first major corner to the first minor corner adjacent thereto in the cutting insert has a positive axial rake angle, and a non-cutting section of the upper cutting edge extending from the first minor corner to the second major corner adjacent thereto has a negative axial rake angle.

A method of manufacturing a machined product according to an embodiment of the present invention includes: rotating the cutting tool according to the foregoing embodiment on a basis of a rotation axis of the holder; bringing the upper cutting edge of the cutting tool being rotated into contact with a surface of a workpiece; and separating the cutting tool from the workpiece.

In the cutting insert according to the embodiment of the present invention, the upper surface alternately has the three major corners, each having the first interior angle, and three minor corners, each having the second interior angle larger than the first interior angle. The upper surface also has the upper cutting edges of identical shape extending from the single major corner to each of the two minor corners adjacent to each other on both sides of the major corner. Accordingly, each of the three major corners is usable for both right-handed and left-handed cutting processes.

Additionally, the upper cutting edge includes the corner cutting edge, the minor cutting edge inclined toward the lower surface as separating from the corner cutting edge at the first inclination angle on the basis of the vertical plane perpendicular to the central axis extending between the upper and lower surfaces, and the major cutting edge inclined toward the lower surface as separating from the minor cutting edge at the second inclination angle larger than the first inclination angle on the basis of the vertical plane. The corner cutting edge, the minor cutting edge and the major cutting edge are located sequentially from the first major corner of the three major corners to each of the first minor corner and the second minor corner of the three minor corners, both of which are adjacent to the first major corner. That is, the upper cutting edge includes the corner cutting edge perpendicular to the central axis, and the minor cutting edge and the major cutting edge formed in a two-stage inclination toward the lower surface in a side view. Hence, both the low cutting resistance and the excellent fracture resistance can be achieved in cooperation with the major corners each having the relatively small first interior angle and the minor corners each having the relatively large second interior angle.

BRIEF DESCRIPTION OF THE DRAWINGS

FIG. 1(*b*) is a plan view (top view) thereof;

FIG. 7(c) is a sectional view thereof taken along line c-c there in;

PREFERRED EMBODIMENTS FOR CARRYING OUT THE INVENTION

<Cutting Insert>

Figure 1A:
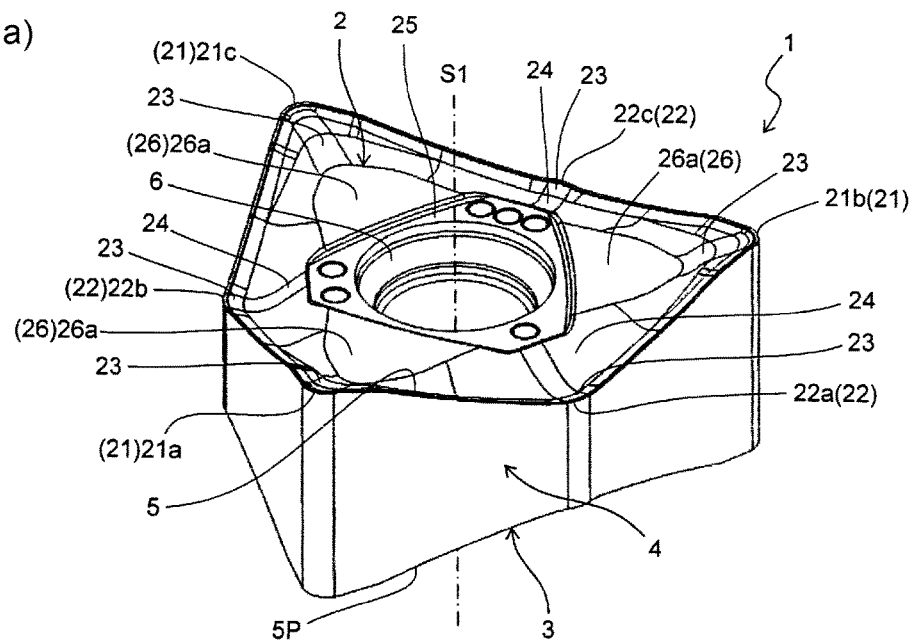
FIG. 1(*a*) is a perspective view of a cutting insert according to an embodiment of the present invention.

A cutting insert according to an embodiment of the present invention is described in details below with reference to FIGS. 1 and 2.

As shown in FIGS. 1 and 2, the insert 1 of the present embodiment generally includes a polygonal shaped (hexagonal shaped) upper surface 2, a lower surface 3 being identical in shape to the upper surface 2, a side surface 4 connected to each of the upper surface 2 and the lower surface 3, a through hole 6 (fitting hole) extending between the upper surface 2 and the lower surface 3, an upper cutting edge 5 located at an intersection of the upper surface 2 and the side surface 4, and a lower cutting edge 5P located at an intersection of the lower surface 3 and the side surface 4. The insert 1 may be configured so that the length of one side of the upper surface 2 is 5 mm to 100 mm and the thickness of each of the upper and lower surfaces 2 and 3 is 3 mm to 100 mm. As shown in FIG. 1, the through hole 6 of the present embodiment is located at a middle part of each of the upper surface 2 and the lower surface 3.

Figure 1B:
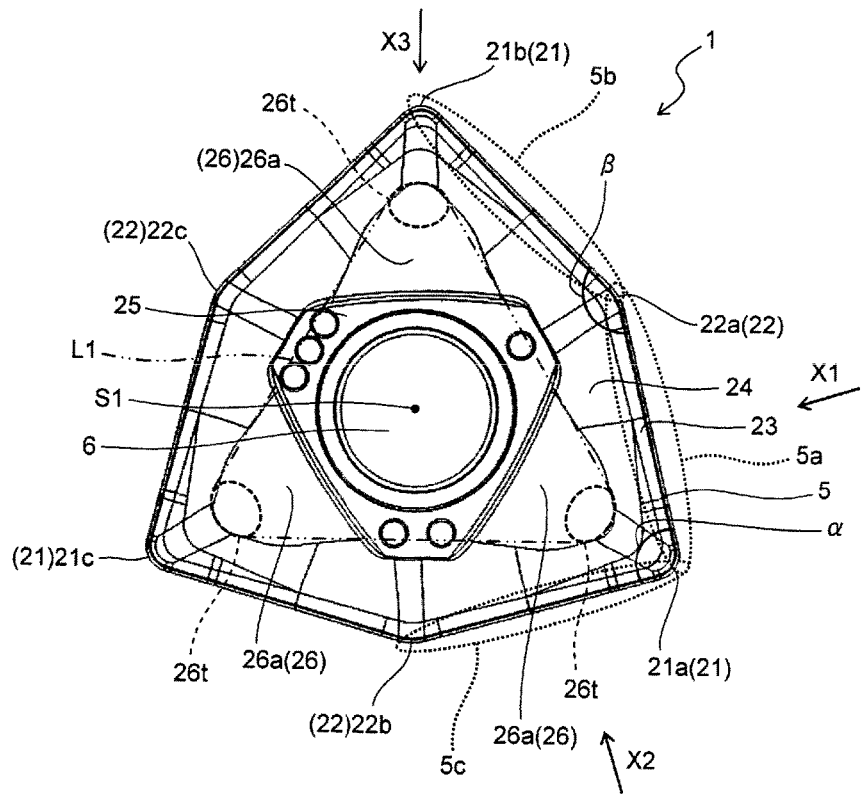

The insert 1 of the present embodiment has a hexagonal shape (substantially hexagonal shape) as shown in FIG. 1(b) in a top view. The phrase "top view" denotes a state that the insert 1 is viewed from the upper surface 2. The concept of the phrase "hexagonal shape" includes somewhat deformation in such a range in which a certain function can be exhibited, without being limited to the case of a strict hexagonal shape (regular hexagon). That is, the hexagonal shape of the present embodiment includes the cases where, for example, individual sides or individual vertexes have a slightly curved line shape.

Further, the upper surface 2 of the insert 1 alternately has three major corners 21 (first to third major corners 21a to 21c), each having a first interior angle α, and three minor corners 22 (first to third minor corners 22a to 22c), each having a second interior angle β larger than the first interior angle α. Similarly, the lower surface 3 of the insert 1 alternately has three major corners 21, each having the first interior angle α, and three minor corners 22, each having the second interior angle β larger than the first interior angle α. Thus, the insert 1 includes the upper cutting edge 5 and the lower cutting edge 5P of identical shapes which are extended from the single major cutting edge 21 to the two adjacent minor corners 22 and 22 on both sides of the single major corner 21. Therefore, the cutting process can be performed by causing a bidirectional rotation for a right-handed operation and a left-handed operation at each of the three major corners 21. That is, the insert 1 of the present embodiment is usable as an insert substantially having the six major corners by using each of the three major corners 21 for the right-handed operation and the left-handed operation.

The first interior angle α is preferably an approximately right angle. The phrase "substantially right angle" denotes an approximately right angle. Specifically, the substantially right angle in the present embodiment is in the range of 90°±3°. Particularly, the first interior angle α is preferably larger than 90°. The second interior angle β is preferably set in the range of 140° to 150°. The lengths of the individual sides are preferably identical from the viewpoint of ensuring a large length of the cutting edges contributing to cutting while using all of the individual sides for the cutting process.

In the insert 1 of the present embodiment, the upper cutting edge 5 is located over the entire circumference of the upper surface 2. Thereby, the three major corners 21 of the insert 1 are usable for the cutting process. Thus, when the cutting process is performed using the upper cutting edge 5, a part of the lower surface 3 functions as a seating surface (mount part) for attaching to a holder 11 described later.

Figure 2A:
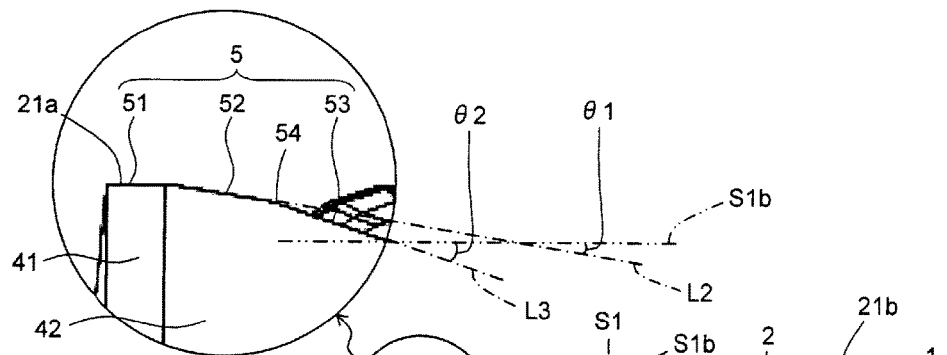
FIG. 2(a) is a side view of the cutting insert shown in FIG. 1, specifically a fragmentary view taken in the direction indicated by arrow X1.
Figure 2A:
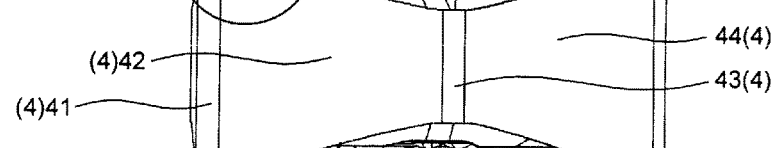
Figure 2B:
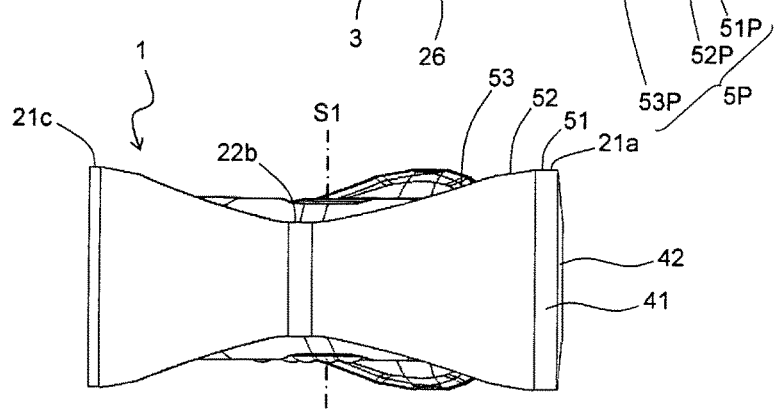
FIG. 2(b) is a fragmentary view thereof taken in the direction indicated by arrow X2.
Figure 2C:
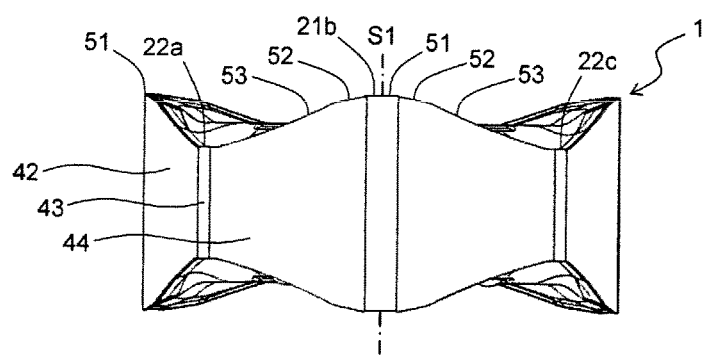
FIG. 2(c) is a fragmentary view taken in the direction indicated by arrow X3.

As shown in FIGS. 1(a) and 2(a), the insert 1 of the present embodiment is a so-called negative type insert allowing both the upper surface 2 and the lower surface 3 to be respectively used as the surface that exhibits a rake function. Accordingly, when the cutting process is performed using the lower cutting edge 5P, a part of the lower surface 3 is usable as a rake surface, and a part of the upper surface 2 is usable as the seating surface (mount part). That is, the upper surface 2 and the lower surface 3 of the insert 1 of the present embodiment have the same shape, and both surfaces are usable for the cutting process. Unless otherwise stated, the description of the upper surface 2 is applicable to the lower surface 3.

Next, the individual components of the insert 1 of the present embodiment are described in details.

The upper surface 2 has a so-called rake function for discharging chips and includes a rake surface 23 inclined toward the lower surface 3, a protruded surface 24 inclined so as to depart from the lower surface 3, and a flat-surface-shaped mount part 26 (seating surface) substantially perpendicular to a central axis S1. The rake surface 23, the protruded surface 24 and the mount part 26 are sequentially located inwardly from the upper cutting edge 5. The term "inward" denotes being located inside the insert 1 with respect to the upper cutting edge 5 and located closer to the through hole 6 (the central axis S1). The phrase "central axis S1" is the axis that extends between the upper surface 2 and the lower surface 3, and serves as a rotation axis when the insert 1 is rotated, in a top view.

The rake surface 23 is continuous with the upper cutting edge 5 as shown in FIG. 1. The rake surface 23 is inclined downwardly, namely, toward the lower surface 3 as going from the upper cutting edge 5 to the central axis S1 at a third inclination angle θ3 (refer to FIG. 7) on the basis of a vertical plane S1$b$ perpendicular to the central axis S1. In the present embodiment, the rake surface 23 is located over the entire circumference of the insert 1. The third inclination angle θ3 is preferably set at 10° to 30°.

The protruded surface 24 is continuous with the rake surface 23 and is inclined at a fourth inclination angle θ4 (not shown) as going from the upper cutting edge 5 to the central axis S1 (inward) in a direction to separate from the lower surface 3, namely, in an upward direction on the basis of the vertical plane S1$b$. In the present embodiment, the protruded surface 24 is located at portions respectively corresponding to the three minor corners 22. The fourth inclination angle θ4 is preferably set at 40° to 70°.

Thus in the insert 1 of the present embodiment, the rake surface 23 is continuous with the mount part 26 at the portions respectively corresponding to the three major corners 21, and is also continuous with the mount part 26 with the protruded surface 24 interposed therebetween, at the portions respectively corresponding to the three minor corners 22.

In the insert 1 of the present embodiment, the mount part 26 has a polygonal shape, particularly a triangular shape as a whole in a top view. The term "polygonal shape" is not limited to ones that are strictly defined as having vertexes, but is the concept including, for example, the configuration that a connection part between two individual sides is somewhat bent within a limit of being necessary to obtain a predetermined operation advantage.

As shown in FIG. 1($b$), the outer periphery of the through hole 6 is located inside a region surrounded by a straight line L1 connecting three top portions 26$t$ of the triangular shaped mount part 26 in a top view. The term "top portions 26$t$" denotes the portions corresponding to the vertexes of the polygonal shape, and may also denote neighboring regions of the vertexes surrounded by oval shapes indicated by dotted lines. This is also true for the following.

The mount part 26 preferably has three separated portions 26$a$ located away from one another as shown in FIG. 1($b$). Thereby, when the insert 1 is attached to the holder 11, the three separated portions 26$a$ of the insert 1 can individually be brought into contact with their respective corresponding contact surfaces of the holder 11, thereby improving the stability of attachment to the holder 11. For example, even when the mount part 26 is subjected to deformation, such as bending, in a firing step in a manufacturing process of the insert 1, because the three separated portions 26$a$ are independent of one another, they can be brought into a relatively strong contact with the contact surfaces of the holder 11 without requiring another manufacturing step, such as a grinding step.

Each of the three separated portions 26$a$ has a triangular shape in a top view. Particularly, one of the triangular shape of each of the separated portions 26$a$ is preferably most adjacent to the major corner 21. This provides further improvement in the stability of attachment to the holder 11. When the cutting process is performed using the upper cutting edge 5, the mount part 26 adjacent to the lower surface 3 becomes the surface brought into contact with the holder 11, and vice versa.

In the mount part 26 adjacent to the lower surface 2, an end portion of the mount part 26, which is located more closer to the central axis S1 than an end portion thereof located closer to the lower cutting edge 5P, is located closer to the upper surface 2, namely, the upper side on the basis of the vertical plane S1$b$. In other words, an outer peripheral region of the mount part 26 adjacent to the lower surface 2 is located outside with respect to a middle region thereof in a thickness direction of the insert 1. According to this configuration, when the insert 1 is attached to the holder 11, the end portion located closer to the lower cutting edge 5P can be relatively strongly contacted with the corresponding contact surface of the holder 11, and the end portion located closer to the central axis S1 can be relatively weakly contacted with the corresponding contact surface of the holder 11. Therefore, the end portion located closer to the central axis S1 can assist the attachment to the holder 11 performed via the end portion located closer to the lower cutting edge 5P, thereby improving the stability of attachment to the holder 11. The inclination angle of the mount part 26 adjacent to the lower surface 2 in the range of from the middle region to the outer peripheral region is preferably set at 80° to 90°.

As shown in FIG. 1, the upper surface 2 further includes a concave part 25 disposed around the through hole 6 and located more closer to the lower surface 3, namely, lower than the mount part 26. The three separated portions 26$a$ are located away from one another with the through hole 6 and the concave part 25 interposed therebetween. According to this configuration, the three separated portions 26$a$ can be more surely individually contacted with their respective corresponding contact surfaces of the holder 11, thereby further improving the foregoing stability of attachment to the holder 11.

As shown in FIG. 2, the upper cutting edge 5 includes a corner cutting edge 51, a minor cutting edge 52 and a major cutting edge 53. Specifically, as shown in FIGS. 1($b$) and 2($a$), the upper cutting edge 5 includes the corner cutting edge 51, the minor cutting edge 52 inclined downwardly, namely, toward the lower surface 3 as separating from the corner cutting edge 51 at a first inclination angle θ1 on the basis of the vertical plane S1$b$, and the major cutting edge 53 inclined downwardly, namely, toward the lower surface 3 as separating from the minor cutting edge 52 at a second inclination angle θ2 larger than the first inclination angle θ1 on the basis of the vertical plane S1$b$. The corner cutting edge 51, the minor cutting edge 52 and the major cutting edge 53 are located sequentially, for example, from the first major corner 21$a$ of the three major corners 21 to each of the first minor corner 22$a$ and the second minor corner 22$b$ of the three minor corners 22, both of which are adjacent to the first major corner 21$a$. Hence, the insert 1 of the present embodiment is capable of having both the low cutting resistance and the excellent fracture resistance in cooperation with the major corners 21 having the foregoing first interior angle α and the minor corners 22 having the second interior angle β.

The first inclination angle θ1 is preferably set at 3° to 15°, and the second inclination angle θ2 is preferably set at 7° to 19°. In the present embodiment, the phrase "first inclination angle θ1" denotes an angle formed by the vertical plane S1$b$ and a virtual extension line L2 of the minor cutting edge 52, and the phrase "second inclination angle θ2" denotes an angle formed by the vertical plane S1$b$ and a virtual extension line L3 of the major cutting edge 53. The phrase "virtual extension line L2" denotes a straight line obtained by extending a tangential line at a start point of the minor cutting edge 52, namely, an end portion of the minor cutting edge 52 located closer to the corner cutting edge 51. Similarly, the phrase "virtual extension line L3" denotes a straight line obtained by extending a tangential line at a start point of the major cutting edge 53, namely, an end portion of the major cutting edge 53 located closer to the minor cutting edge 52.

The corner cutting edge 51 is located at an intersection of a later-described major corner side surface 41 of the side surface 4 and the upper surface 2 as shown in FIG. 2. The corner cutting edge 51 functions to suppress a fracture of the major cutting edge 5 due to a cutting force applied thereto during the cutting process. The corner cutting edge 51 has a curved line shape in a top view. In the present embodiment, the corner cutting edge 51 is perpendicular to the central axis S1 and is parallel to the vertical plane S1b.

The minor cutting edge 52 is located closer to the corner cutting edge 51 in an intersection of a later-described first side surface 42 of the side surface 4 and the upper surface 2 as shown in FIG. 2. As shown in FIG. 1(b), the minor cutting edge 52 functions as first and second major cutting edge sections 5a and 5c together with the major cutting edge 53. The minor cutting edge 52 is also a cutting edge, so-called flat drag, functioning mainly to improve the accuracy of a later-described finished surface 102 of a workpiece 100. In the present embodiment, the minor cutting edge 52 has a straight line shape.

The major cutting edge 53 is located closer to the first minor corner 22a in the intersection of the first side surface 42 and the upper surface 2 as shown in FIG. 2. The major cutting edge 53 functions mainly to generate chips during the cutting process. In the present embodiment, the major cutting edge 53 has a concave shape recessed toward the lower surface 3 in a side view. The phrase "side view" denotes a state that the insert 1 is viewed from the side surface 4. A connection portion 54 of the major cutting edge 53 and the minor cutting edge 52 is preferably set to bend in a direction to separate from the lower surface 3, namely, in an upward direction, in the range of R1.0 to R10.0.

Thus, the upper cutting edge 5 is inclined toward the lower surface 3 as going to the corner cutting edge 51, the minor cutting edge 52 and the major cutting edge 53. Consequently, the upper cutting edge 5 has high cutting edge strength in the vicinity of the corner cutting edge 51, and also achieves the low cutting resistance in the vicinity of the major cutting edge 53. Although the thickness of the insert 1 is decreased as going to the corner cutting edge 51, the minor cutting edge 52 and the major cutting edge 53, the distance from the through hole 6 to the individual cutting edges is increased. This configuration ensures high cutting edge strength in each of the cutting edge regions.

Similarly to the upper cutting edge 5, the lower cutting edge 5P also has a corner cutting edge 51P, a minor cutting edge 52P and a major cutting edge 53P. The configurations of the corner cutting edge 51P, the minor cutting edge 52P and the major cutting edge 53P are respectively identical to those of the corner cutting edge 51, the minor cutting edge 52 and the major cutting edge 53.

The side surface 4 is the surface functioning as a so-called clearance part for reducing contact with the workpiece 100. In the present embodiment, the side surface 4 is perpendicular to the upper surface 2 and the lower surface 3 as shown in FIG. 2. Compared with an insert whose side surface forms a clearance angle together with the upper surface 2 or the lower surface 3, the thickness of the insert 1 can be ensured, thus imparting excellent fracture resistance to the insert 1.

As a specific configuration, the side surface 4 connected to the hexagonal shaped upper surface 2 has a major corner side surface 41, a first side surface 42, a minor corner side surface 43 and a second side surface 44, which are located sequentially from a first major corner 21a to a second major corner 21b, as shown in FIG. 2(a). Both the first side surface 42 and the second side surface 44 are flat surfaces, and both the major corner side surface 41 and the minor corner side surface 43 are curved surfaces.

The through hole 6 functions to fix the insert 1 to the later-described holder 11. That is, a fitting screw 12 (fixing member) is inserted into the through hole 6 and is further screwed to the holder 11. A cutting tool 10 is obtained by fixing the insert 1 to the holder 11 in this manner. The central axis of the through hole 6 exists at the same position as the central axis S1.

(Modifications)

Examples of modifications of the insert 1 according to the foregoing embodiment are described in details with reference to FIGS. 3 to 7.

A basic configuration of the insert 1 of the present modification is similar to that of the insert 1 of the foregoing embodiment. Therefore, in FIGS. 3 to 7, the same elements as those in FIGS. 1 and 2 are identified by the same reference numerals, and their respective descriptions are omitted here. The following description is focused on portions whose configurations are different from those of the foregoing embodiment.

Similarly to the cutting insert 1 of the foregoing embodiment, an upper cutting edge 5 of the insert 1 of the present modification includes a corner cutting edge 51, a minor cutting edge 52 and a major cutting edge 53. Specifically, as shown in FIGS. 3(b) and 4(a), the upper cutting edge 5 of the present modification includes the corner cutting edge 51, the minor cutting edge 52 inclined toward a lower surface 3 as separating from the corner cutting edge 51 at a first inclination angle $\theta1$ on the basis of a vertical plane S1b, and the major cutting edge 53 inclined toward the lower surface 3 as separating from the minor cutting edge 52 at a second inclination angle $\theta2$ larger than the first inclination angle $\theta1$ on the basis of the vertical plane S1b. The corner cutting edge 51, the minor cutting edge 52 and the major cutting edge 53 are located sequentially, for example, from a first major corner 21a of three major corners 21 to each of a first minor corner 22a and a second minor corner 22b of three minor corners 22, both of which are adjacent to a first major corner 21a.

Figure 4A:
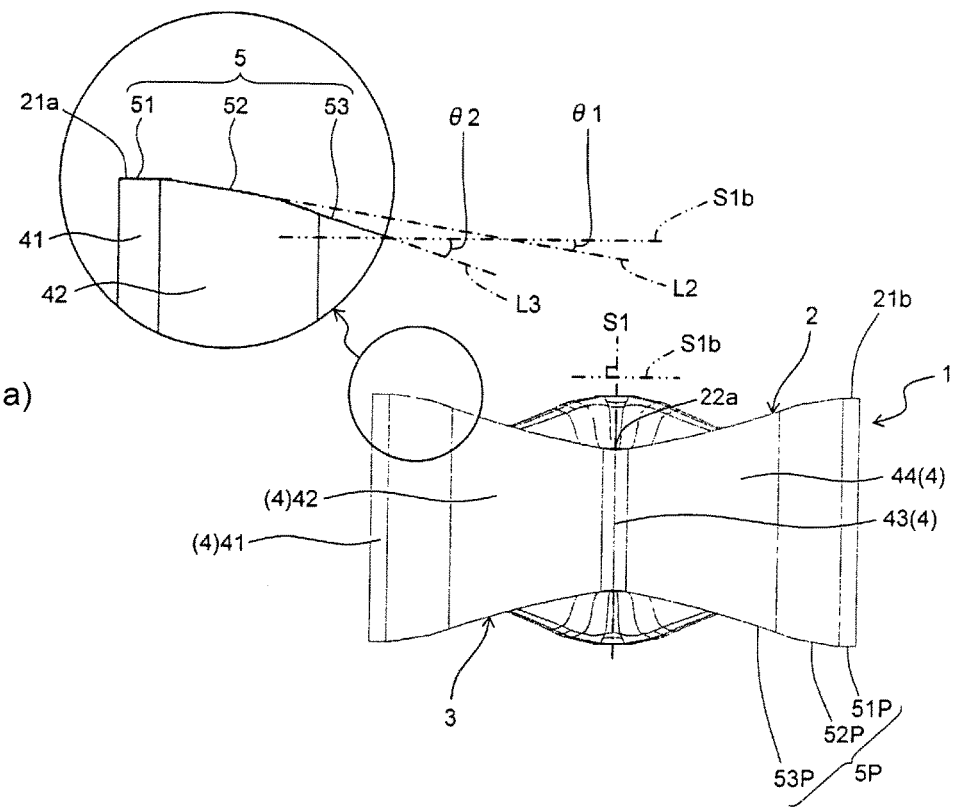
FIG. 4(a) is a side view of the cutting insert shown in FIG. 3, specifically a fragmentary view taken in the direction indicated by arrow Z1.
Figure 4B:
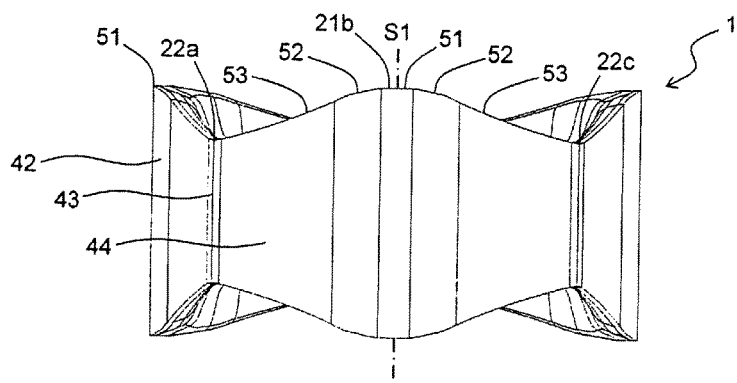
FIG. 4(b) is a fragmentary view thereof taken in the direction indicated by arrow Z2.

As shown in FIG. 4, in the upper cutting edge 5 of the present modification, the minor cutting edge 52 has a straight line shape, and the major cutting edge 53 is continuous with the minor cutting edge 52 and has a concave shape recessed toward the lower surface 3 in a side view.

Figure 5:
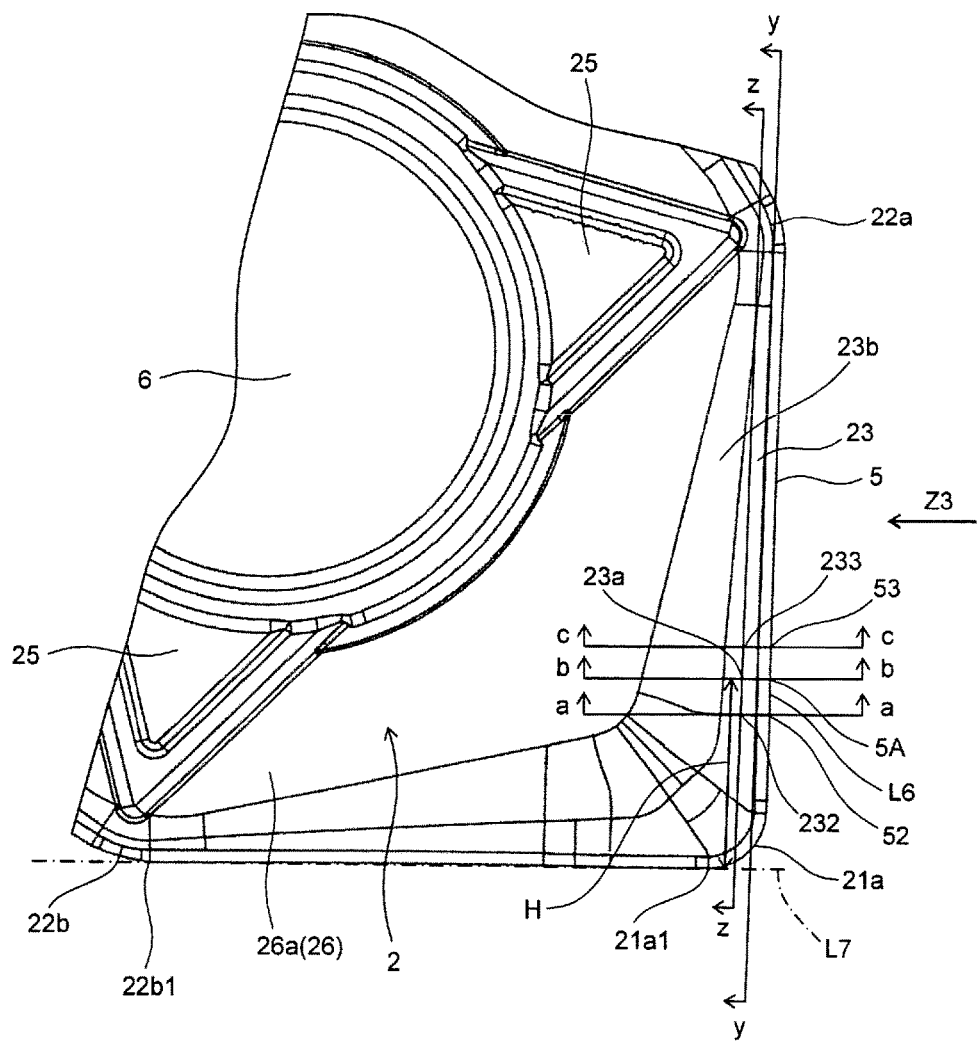
FIG. 5 is a partially enlarged plan view (top view) of the cutting insert shown in FIG. 3.
Figure 6A:
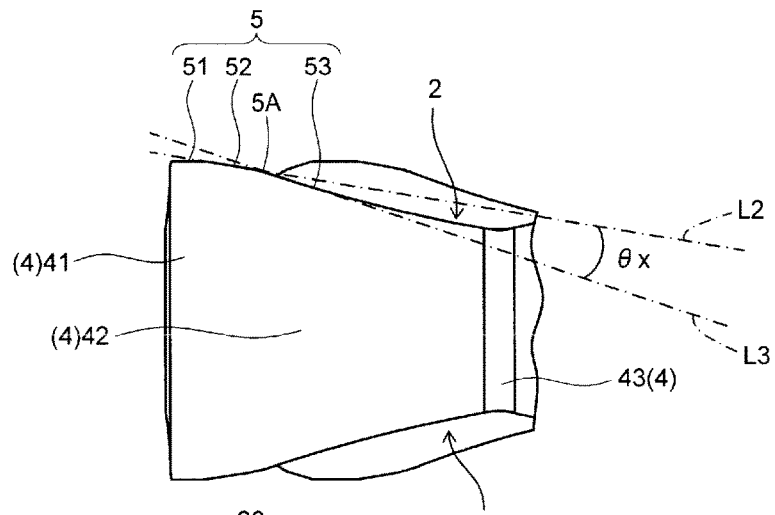
FIG. 6(a) is a view of the cutting insert shown in FIG. 5, specifically a fragmentary side view taken in the direction indicated by arrow Z3.
Figure 6B:
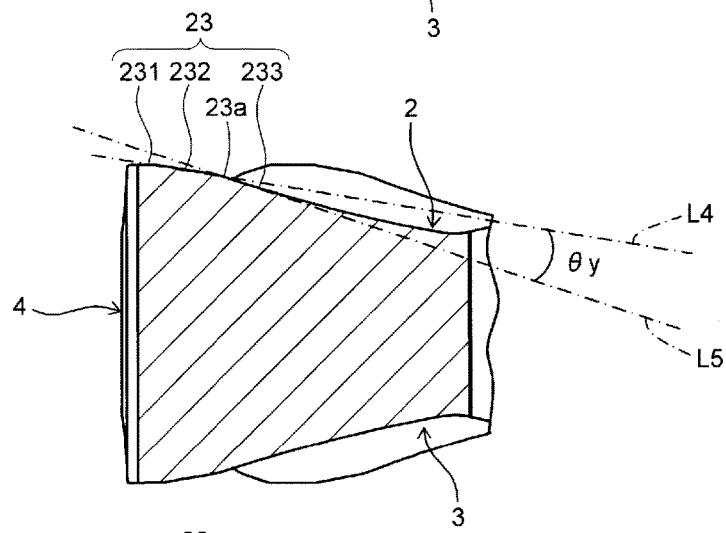
FIG. 6(b) is a sectional view thereof taken along line y-y.
Figure 6C:
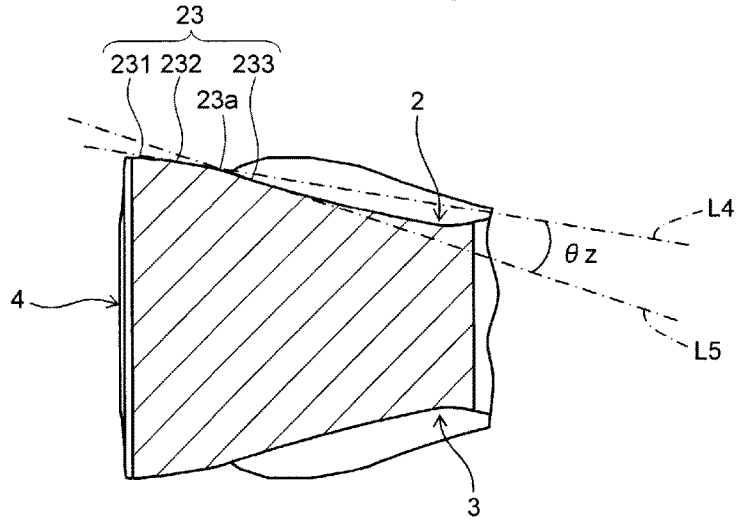
FIG. 6(c) is a sectional view thereof taken along line z-z.

As shown in FIGS. 5 and 6, a rake surface 23 of the present modification includes a corner rake surface 231 located inward of the corner cutting edge 51, a minor rake surface 232 located inward of the minor cutting edge 52, and a major rake surface 233 located inward of the major cutting edge 53.

In addition to the foregoing configurations, as shown in FIG. 6, the present modification includes a configuration that an angle $\theta z$ formed by the minor rake surface 232 and the major rake surface 233 is substantially identical to an angle $\theta x$ formed by the minor cutting edge 52 and the major cutting edge 53. This configuration reduces cutting edge damage to a portion of the upper cutting edge 5 having relatively low cutting edge strength in the vicinity of a boundary of the minor cutting edge 52 having the straight line shape and the major cutting edge 53 having the concave shape recessed toward the lower surface 3. Consequently, the insert 1 of the present modification can also be used for a cutting process of so-called heavy-duty cutting. In the present modification, an angle θy is also substantially identical to the angles θx and θz.

In the present modification, the angles θx and θy denote angles formed by a virtual extension line L4 of the minor rake surface 232 and a virtual extension line L5 of the major rake surface 233. The phrase "virtual extension line L4" denotes a straight line obtained by extending a tangential line at a start point of the minor rake surface 232, namely, an end portion of the minor rake surface 232 located closer to the corner rake surface 231. Similarly, the phrase "virtual extension line L5" denotes a straight line obtained by extending a tangential line at a start point of the major rake surface 233, namely, an end portion of the major rake surface 233 located closer to the minor rake surface 232. In the present modification, the angle θx denotes an angle formed by the virtual extension line L2 of the minor cutting edge 52 and the virtual extension line L3 of the major cutting edge 53. The sentence "the angles θx, θy and θz are substantially identical to one another" denotes that a difference of ±1° may exit therebetween. Alternatively, the angle θz may be smaller than the angle θx. According to this configuration, the strength of the corresponding rake surface 23 can be increased to thereby reduce the cutting edge damage at the portion having relatively low cutting edge strength in the vicinity of the boundary of the minor cutting edge 52 and the major cutting edge 53.

Further in the present modification, as shown in FIGS. 5 and 6, a boundary 23a of the minor rake surface 232 and the major rake surface 233 extends from a cutting edge boundary 5A of the minor cutting edge 52 and the major cutting edge 53 in a direction approximately perpendicular to a tangential line L6 at the cutting edge boundary 5A in a top view. According to this configuration, a relatively large cutting force applied to the vicinity of the cutting edge boundary 5A of the minor cutting edge 52 and the major cutting edge 53 during the cutting process can be received by the strength of the boundary 23a of the minor rake surface 232 and the major rake surface 233, thereby reducing damage to the cutting edge boundary 5A of the minor cutting edge 52 and the major cutting edge 53 in the upper cutting edge 5. The phrase "substantially perpendicular" denotes being approximately perpendicular. Specifically, the "substantially perpendicular" in the present modification includes such a range that an angle formed by the boundary 23a and the tangential line L6 is in the range of 90°±3°.

Furthermore, as shown in FIGS. 5 and 6, a distance H from a straight line L7 connecting the first major corner 21a and the second minor corner 22b is substantially constant in the boundary 23a of the minor rake surface 232 and the major rake surface 233, which is located between the first major corner 21a and the first minor corner 22a in a top view. This configuration also reduces the cutting edge damage to the portion of the upper cutting edge 5 having relatively small cutting edge strength in the vicinity of the cutting edge boundary 5A of the straight line shaped minor cutting edge 52 and the major cutting edge 53 having the concave shape recessed toward the lower surface 3. The straight line L7 is more specifically described below. That is, the straight line L7 is the straight line connecting an end portion 21a1 of the first major corner 21a located closer to the second minor corner 22b, and an end portion 22b1 of the second minor corner 22b located closer to the first major corner 21a. The phrase "substantially constant" denotes being equal to being approximately constant. Alternatively, the distance H may be increased as separating from the cutting edge 5. This configuration also reduces the cutting edge damage to the portion having the relatively small cutting edge strength in the vicinity of the minor cutting edge 52 and the major cutting edge 53.

Figure 7A:
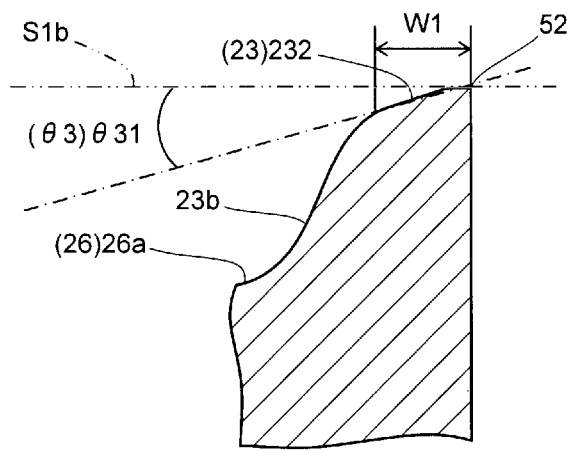
FIG. 7(a) is a sectional view taken along line a-a of the cutting insert in FIG. 5.
Figure 7B:
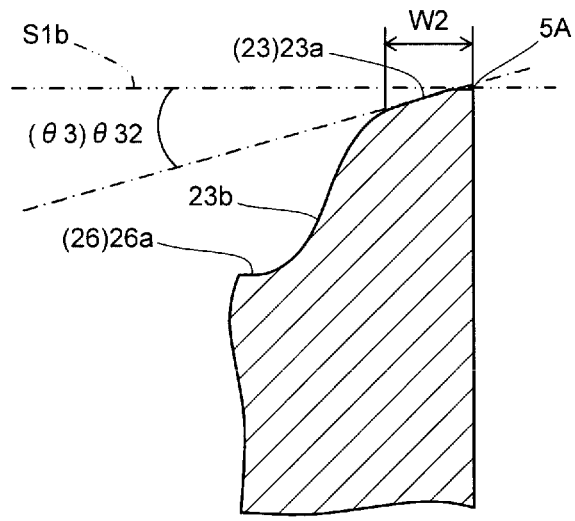
FIG. 7(b) is a sectional view thereof taken along line b-b therein.
Figure 7C:
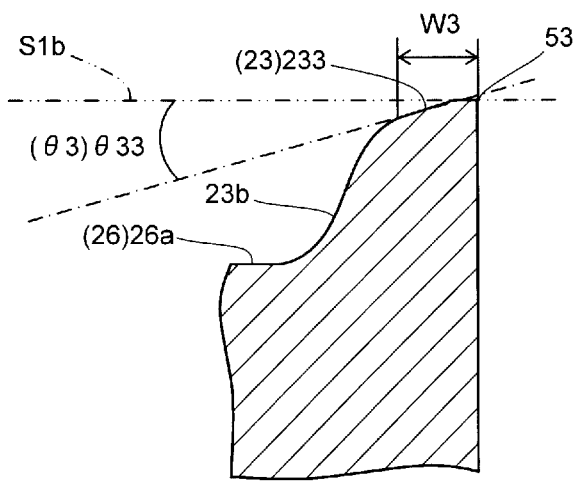

As shown in FIG. 7, a third inclination angle θ3 of the rake surface 23 is substantially constant in terms of a rake angle θ31 of the minor rake surface 232, a rake angle θ32 of the boundary 23a of the minor rake surface 232 and the major rake surface 233, and a rake angle θ33 of the major rake surface 233. According to this configuration, the cutting force applied during the cutting process can be dispersed in the range from the minor rake surface 232 to the major rake surface 233 without being applied locally, thereby reducing damage to the boundary 23a of the minor cutting edge 52 and the major cutting edge 53. As described above, the phrase "substantially constant" denotes being equal to being approximately constant. As an example, the cutting edge strength at the boundary 23a of the minor cutting edge 52 and the major cutting edge 53 may be further improved by establishing relationships of θ32<θ31 and θ32<θ33. As another example, the third inclination angle θ3 of the rake surface 23 may be increased as going inward. According to this configuration, the strength of the corresponding rake surface 23 can be increased to thereby reduce the cutting edge damage at the portion having the relatively small cutting edge strength in the vicinity of the boundary of the minor cutting edge 52 and the major cutting edge 53.

As shown in FIGS. 5 and 7, a width W of the rake surface 23 is decreased as going from the first major corner 21a to the first minor corner 22a. That is, as shown in FIG. 7, the width W of the rake surface 23 of the present modification has a relationship of W1>W2>W3. Alternatively, the cutting edge strength at the cutting edge boundary 5A of the minor cutting edge 52 and the major cutting edge 53 may be further improved by allowing the width W of the rake surface 23 to have relationships of W2>W1 and W2>W3.

The rake surface 23 of the present modification is continuous with a mount part 26 with a connection surface 23b interposed there between, as shown in FIGS. 5 and 7. The connection surface 23b functions as a clearance part for chips passing through the rake surface 23, and also contributes to ensuring a large area of the mount part 26.

Figure 3A:
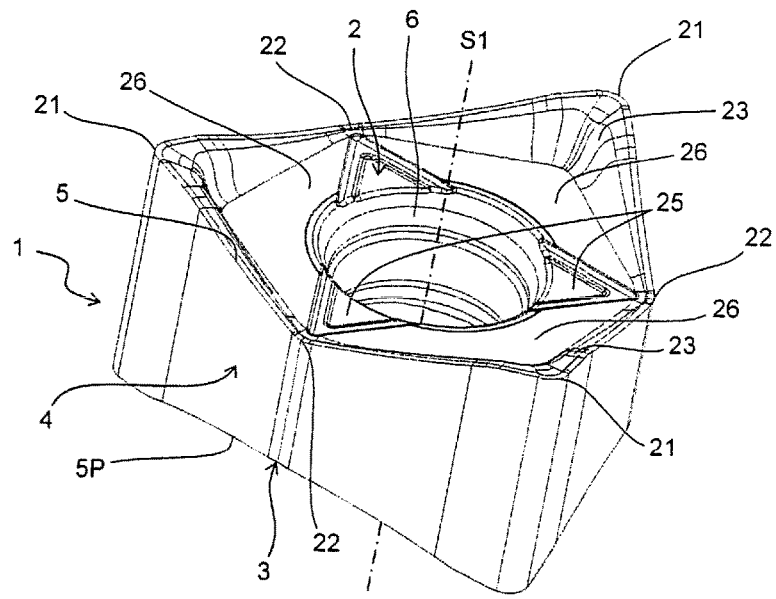
FIG. 3(a) is a perspective view of a modification of the cutting insert shown in FIG. 1.
Figure 3B:
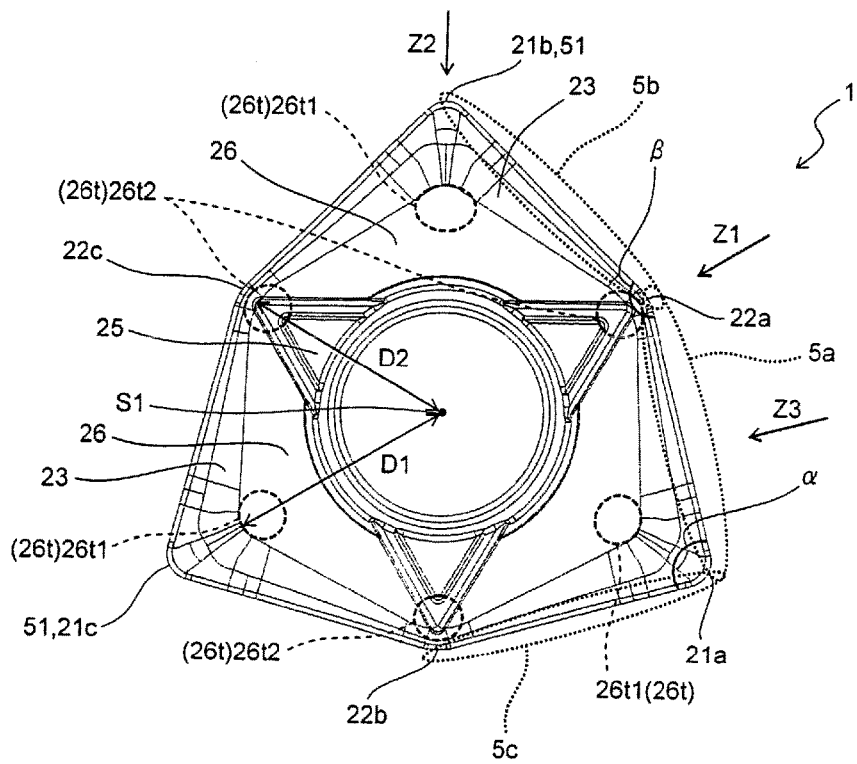
FIG. 3(b) is a plan view (top view) thereof.

In the insert 1 of the present modification, the mount part 26 has a hexagonal shape in a top view as shown in FIG. 3. Therefore, the insert 1 can be attached to the holder 11 using six top portions 26t of the hexagonal shape, thus improving the stability of attachment to the holder 11. As shown in FIG. 3(b), though the upper surface 2 includes a concave part 25, the mount part 26 of the present modification is integrally formed without being separated.

The six top portions 26t of the mount part 26 include three major top portions 26t1 respectively located correspondingly to the three major corners 21, and three minor top portions 26t2 respectively located correspondingly to the three minor corners 22. Thus, these top portions 26t are located correspondingly to corner portions susceptible to a relatively large cutting force during the cutting process. Therefore, by attaching the insert 1 to the holder 11 via the corner portions, chatter vibration can be reduced, thereby reducing damage to the upper cutting edge 5.

In the insert 1 of the present modification, the three major top portions 26t1 have a larger distance from the central axis S1 than the three minor top portions 26t2. That is, as shown in FIG. 3(b), the major top portions 26t1 and the minor top portions 26t2 of the present modification satisfy a relationship of D1>D2. According to this configuration, cutting edge regions functioning as first and second major cutting sections 5a and 5c can be brought into contact with the holder 11 by using the three major top portions 26t1 respectively located relatively remote portions from the central axis S1, and other regions can also be brought into contacted with the holder 11 by using the three minor top portions 26t2. Hence, the three minor top portions 26t2 can assist the attachment to the holder 11 performed via the three major top portions 26t1, thereby improving the stability of attachment to the holder 11.

In the mount part 26 of the lower surface 3, the three major top portions 26t1 are located more away from the upper surface 2, namely, lower than the three minor top portions 26t2 on the basis of the vertical plane S1b. According to this configuration, when the insert 1 is attached to the holder 11 with the upper surface 2 oriented forward in a rotation direction, the three major top portions 26t1 can be brought into a relatively strong contact with the corresponding contact surfaces of the holder 11, and the three minor top portions 26t2 can be brought into a relatively weak contact with the corresponding contact surfaces of the holder 11. Hence, the three minor top portions 26t2 can assist the attachment to the holder 11 performed via the three major top portions 26t1, thereby improving the stability of attachment to the holder 11.

In the insert 1 of the present modification, as shown in FIG. 4, the mount part 26 of the upper surface 2 is located (further lower) closer to the lower surface 3 than any portion of the upper cutting edge 5 in a side view. This configuration prevents the chips generated by the upper cutting edge 5 from colliding with the mount part 26 during the cutting process, thereby reducing damage to the mount part 26. Specifically, compared with the insert 1 of the foregoing embodiment, the insert 1 of the present modification has the same thickness between the mount parts 26 of the upper and lower surfaces, whereas both a maximum thickness and a minimum thickness in a thickness direction from the upper surface 2 to the lower surface 3 are set at a value larger than the thickness between the mount parts 26 of the upper and lower surfaces. Accordingly, the distance between the upper cutting edge 5 and the mount part 26 of the upper surface 2 can be increased thereby to ensure a larger space for generating chips, thus improving chip discharge performance. For example, if the shape of the mount part 26 is subjected to deformation, such as bending, during a firing process in the manufacturing steps of the insert 1, it is difficult to perform shaping by a grinding process when the mount part 26 is located more closer to the lower surface 3 than the upper cutting edge 5 as described above. However, the insert 1 can be stably contacted with the contact surface of the holder 11 by sloping the mount part 26 without requiring any grinding process.

<Cutting Tool>

Figure 8A:
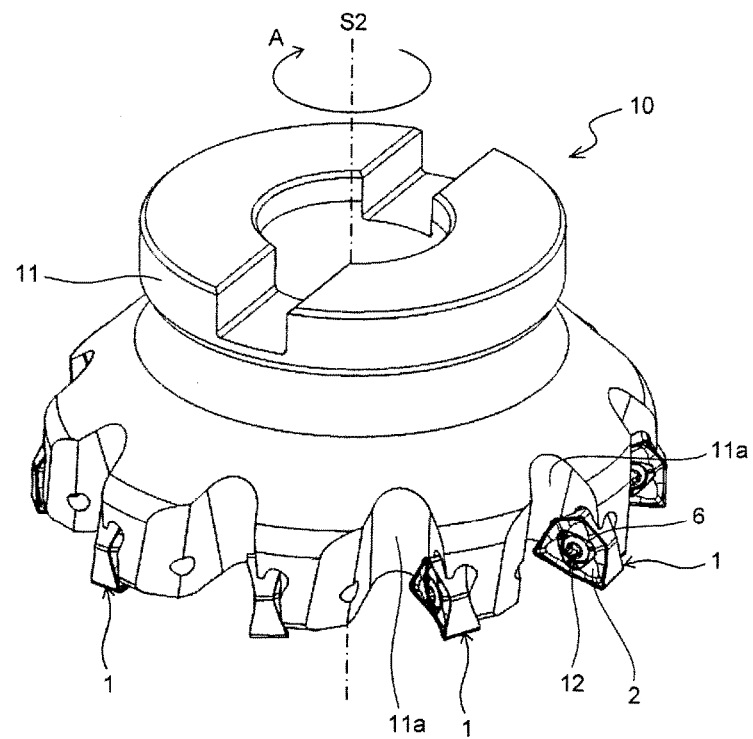
FIG. 8(a) is a perspective view of a cutting tool according to an embodiment of the present invention.

A cutting tool according to an embodiment of the present invention is described in details below with reference to FIGS. 8 and 9.

Figure 8B:
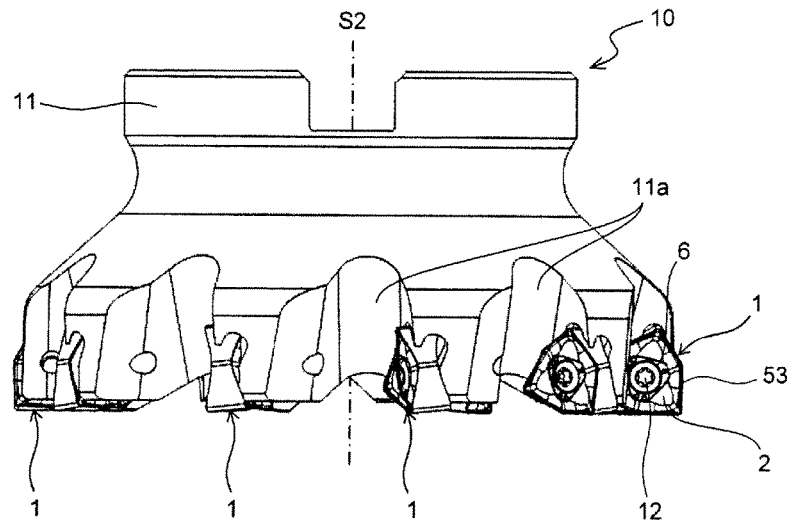
FIG. 8(b) is a side view thereof.

As shown in FIG. 8, the cutting tool 10 of the present embodiment includes a plurality of inserts 1 as described above, and a holder 11 configured to attach the plurality of inserts 1 thereto by using a fixing member.

The holder 11 has a plurality of insert pockets 11a at outer peripheral front ends thereof. The inserts 1 are respectively attached to outer peripheral positions in the insert pockets 11a. Specifically, when the cutting tool 10 is rotated in the direction indicated by arrow A in FIG. 8(a), the inserts 1 are attached so that the upper surface (rake surface) 2 is oriented forward in the direction indicated by arrow A as the rotation direction, and the major cutting edge 53 is located at the outermost periphery of the holder 11. As an attachment method, the plurality of inserts 1 are respectively fixed to the holder 11 by inserting a fitting screw 12 (fixing member) into each of through holes 6 of the plurality of inserts 1, and by screwing the fitting screw 12 to the holder 11.

Figure 9A:
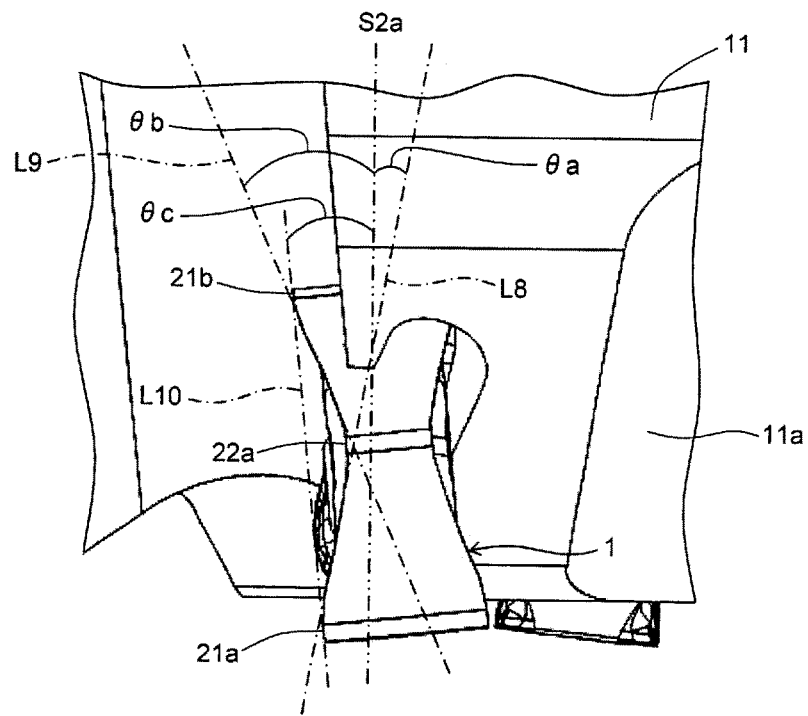
FIG. 9(a) is a side view showing in enlarged scale the cutting insert attachment condition in the cutting tool of FIG. 8, specifically a view of the cutting insert taken from a side surface thereof.

In the present embodiment, as shown in FIG. 9(a), each of the inserts 1 is attached to the holder 11 in a state that a first major cutting section 5a of an upper cutting edge 5 extending from a first major corner 21a to a first minor corner 22a adjacent thereto has a positive axial rake angle θa, and a non-cutting section 5b of the upper cutting edge 5 extending from the first minor corner 22a to a second major corner 21b adjacent thereto has a negative axial rake angle θb on the basis of a parallel plane S2a parallel to a rotation axis S2 of the holder 11.

The first major cutting section 5a includes a minor cutting edge 52 and a major cutting edge 53, and has a positive axial rake angle θa both in the minor cutting edge 52 and the major cutting edge 53 in the present embodiment. For example, the axial rake angle of the minor cutting edge 52 is preferably set at 0° to 10°, and the axial rake angle of the major cutting edge 53 is preferably set at 5° to 20°. With respect to a curved line shaped cutting edge, such as the major cutting edge 53, the axial rake angle θa may be measured using a straight line L8 obtained by extending a tangential line at a start point of the major cutting edge 53, namely, an end portion thereof located closer to the minor cutting edge 52. The axial rake angle θb may be measured using a straight line L9 obtained by extending a tangential line at a start point of the non-cutting section 5b, namely, an end portion thereof located closer to the first minor corner 22a.

As shown in FIG. 9(a), each of the inserts 1 is also attached to the holder 11 in a state that a straight line L10 connecting the first major corner 21a and the second major corner 21b of the upper cutting edge 5 has a negative axial rake angle θc. In other words, the entirety including the first major cutting section 5a and the non-cutting section 5b has a negative axial rake angle.

The cutting tool 10 is obtained by attaching the inserts 1 to the holder 11 in the above manner. A workpiece 100 can be subjected to a face milling process or a plunge milling process as described later by rotating the cutting tool 10 in the direction indicated by arrow A.

Figure 9B:
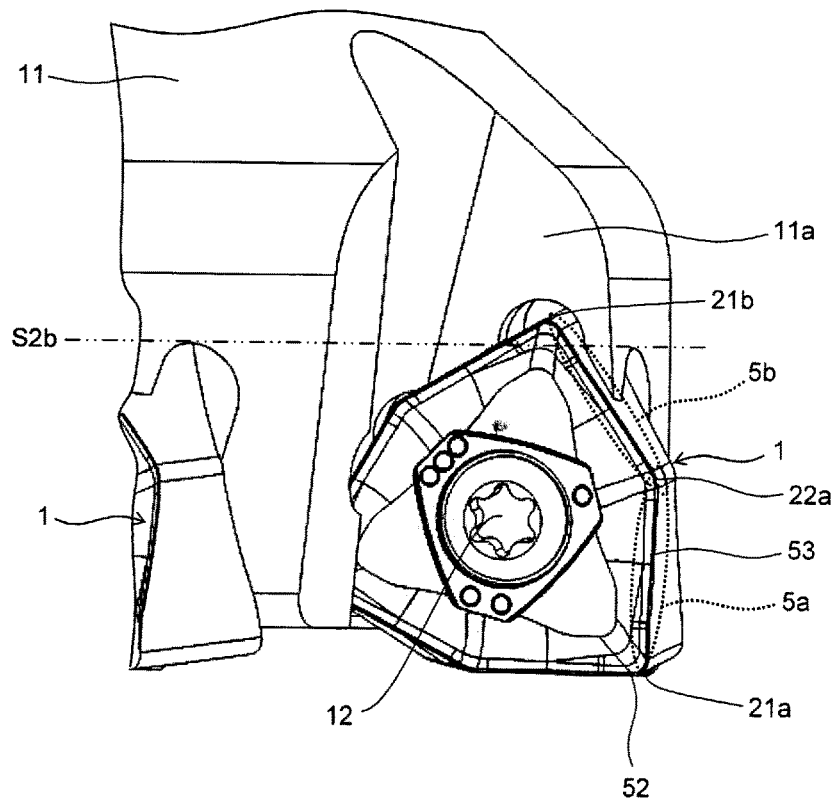
FIG. 9(b) is a view of the cutting insert taken from an upper surface thereof.

For example, when the face milling process is performed as shown in FIG. 9(b), a cutting target surface 101 is formed by cutting the workpiece 100 with the first major cutting section 5a of the insert 1, and a finished surface 102 is formed by cutting the workpiece 100 with the minor cutting edge 52. Hereat, a setting is made so that the minor cutting edge 52 has a substantially parallel relationship with a vertical plane S2b perpendicular to a rotation axis S2 of the holder 11.

<Method of Manufacturing Machined Product>

Next, methods of manufacturing a machined product according to a first or second embodiment of the present invention are described in details below with reference to FIG. 10 or 11.

The method of manufacturing a machined product according to the first or second embodiment includes rotating the foregoing cutting tool 10 on the basis of the rotation axis S2 of the holder 11; bringing the upper cutting edge 5 of the cutting tool 10 being rotated into contact with a surface of the workpiece 100; and separating the cutting tool 10 from the workpiece 100. The first and second embodiments are respectively described in details below.

First Embodiment

The method of manufacturing a machined product according to the first embodiment is described in details with reference to FIG. 10 by taking the example of so-called face milling process.

The method of manufacturing a machined product according to the present embodiment includes the following steps (i) to (iii). In the following, the order of these steps may be changed suitably unless otherwise stated.

Figure 10A:
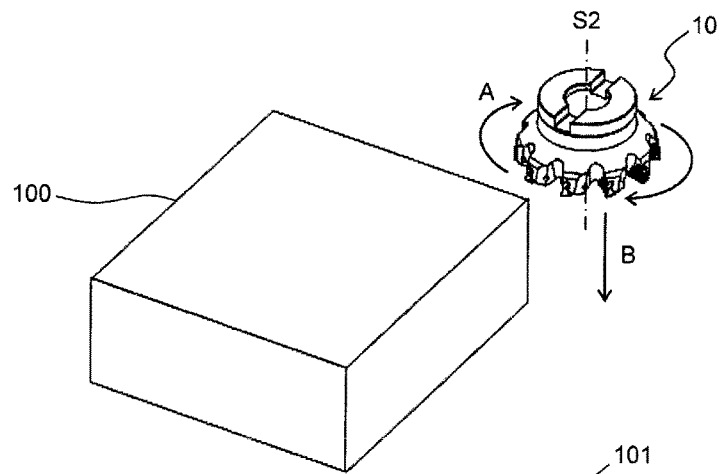
FIGS. 10(a) to 10(c) are process drawings showing a method of manufacturing a machined product according to a first embodiment of the present invention.

The step (i) includes: rotating the cutting tool 10 around the rotation axis S2 of the holder 11 (cutting tool 10) in the direction indicated by arrow A as shown in FIG. 10(a); and bringing the cutting tool 10 near the workpiece 100 by moving the cutting tool 10 in the direction indicated by arrow B.

Figure 10B:
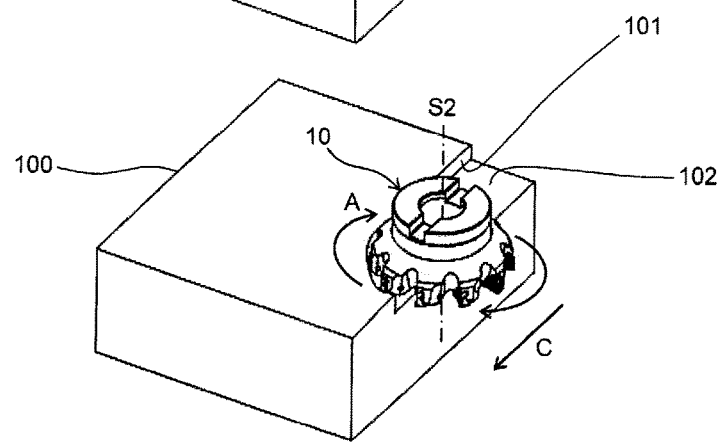

The step (ii) is to bring the upper cutting edge 5 of the cutting tool 10 being rotated into contact with the surface of the workpiece 100 as shown in FIG. 10(b). In the present embodiment, the step (ii) includes the following three sub-steps.

The first substep is to allow the cutting tool 10 being rotated to move in the direction indicated by arrow C that is the direction perpendicular to the rotation axis S2. Thereby, the workpiece 100 can be subjected to the face milling process.

The second substep is to bring the first major cutting section 5a of the upper cutting edge 5 extending from the first major corner 21a to the first minor corner 22a adjacent thereto in the cutting tool 10 being rotated, into contact with the surface of the workpiece 100. Consequently, a cutting target surface of the workpiece 100 cut by being brought into contact with the first major cutting section 5a becomes a finished surface 101 as shown in FIG. 10(b).

The third substep is to bring the minor cutting edge 52 of the upper cutting edge 5 located between the first major corner 21a and the second minor corner 22b in the cutting tool 10 being rotated, into contact with the cutting target surface of the workpiece 100 formed by being brought into contact with the first major cutting section 5a. Thereby, a portion of the cutting target surface of the workpiece 100 cut by the first major cutting section 5a in the foregoing second substep, which remains without being directly cut by the first major cutting section 5a, can be smoothed by the minor cutting edge 52, resulting in a finished surface 102 as shown in FIG. 10(b).

Figure 10C:
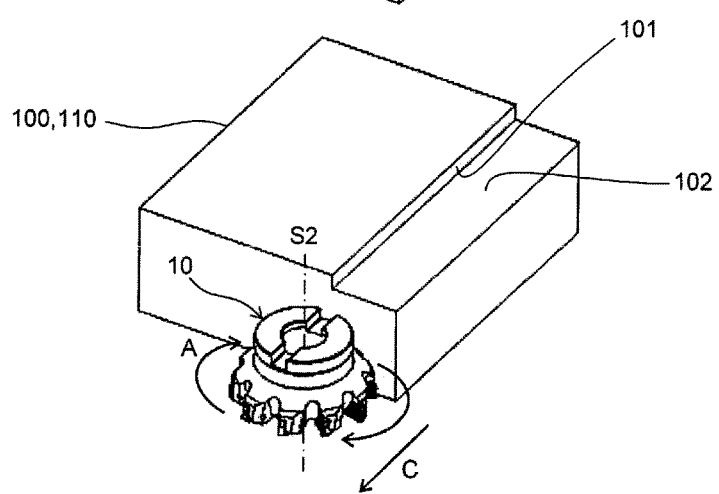

The step (iii) is to separate the cutting tool 10 from the workpiece 100 by moving the cutting tool 10 just as it is in the direction indicated by arrow C, as shown in FIG. 10(c).

A machined product 110, which is obtained by cutting the workpiece 100 into the desired shape as shown in FIG. 10(c), is manufactured by being subjected to the foregoing individual steps.

When the cutting process is continuously performed, for example, it is required to repeat the step of bringing the upper cutting edge 5 of the cutting tool 10 into contact with different portions of the workpiece 100, while keeping the rotation of the cutting tool 10. When the major corner 21 of the upper cutting edge 5 used for the cutting process is worn, the major corner 21 of the upper cutting edge 5 not yet being used can be used by rotating the insert 1 by 120° with respect to the central axis S1. Additionally in the present embodiment, the single major corner 21 of the insert 1 is usable for a reverse-handed cutting process by rotating the cutting tool 10 in the opposite direction to the direction indicated by the arrow A. This permits use as the insert substantially having the six major corners by using each of the three major corners 21 for right-handed and left-handed operations. By changing the rotation direction of the cutting tool 10 to the opposite direction to that indicated by the arrow A, the minor cutting edge 52 in the first major cutting section 5a functions as a cutting edge for forming the finished surface 102. In the present embodiment, the description of the upper cutting edge 5 is also true for the lower cutting edge 5P.

The following modifications are applicable to the foregoing steps. For example, in the step (i), the workpiece 100 may be rotated while keeping the cutting tool 10 stationary. Alternatively, the cutting tool 10 and the workpiece 100 need to be closer to each other. For example, the workpiece 100 may be brought near the cutting tool 10. Similarly, in the step (iii), the workpiece 100 and the cutting tool 10 need to be separated from each other. For example, the workpiece 100 may be separated from the cutting tool 10 being held at a predetermined position. These modifications are also applicable to the following second embodiment.

Second Embodiment

The method of manufacturing a machined product according to the second embodiment is described in details with reference to FIG. 11 by taking the example of so-called plunge milling process.

The method of manufacturing a machined product according to the present embodiment includes the following steps (i) to (iii). In the following, the order of these steps may be changed suitably unless otherwise stated.

Figure 11A:
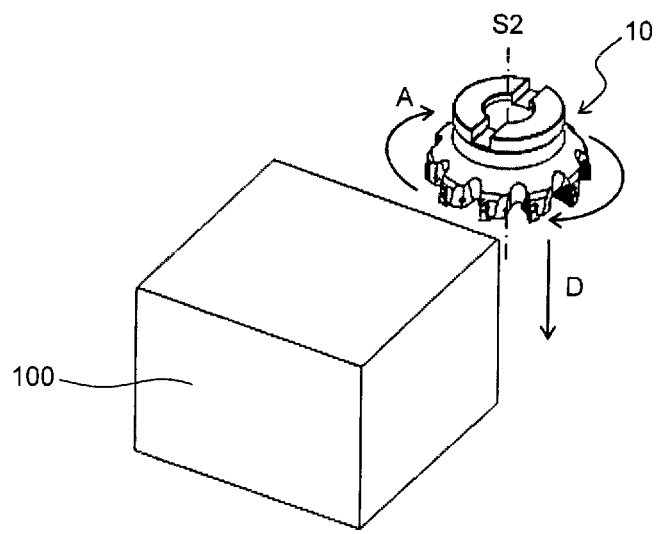
FIGS. 11(a) to 11(c) are process drawings showing a method of manufacturing a machined product according to a second embodiment of the present invention.

The step (i) includes: rotating the cutting tool 10 around the rotation axis S2 of the holder 11 (cutting tool 10) in the direction indicated by arrow A as shown in FIG. 11(a); and bringing the cutting tool 10 near the workpiece 100 by moving the cutting tool 10 in the direction indicated by arrow D.

Figure 11B:
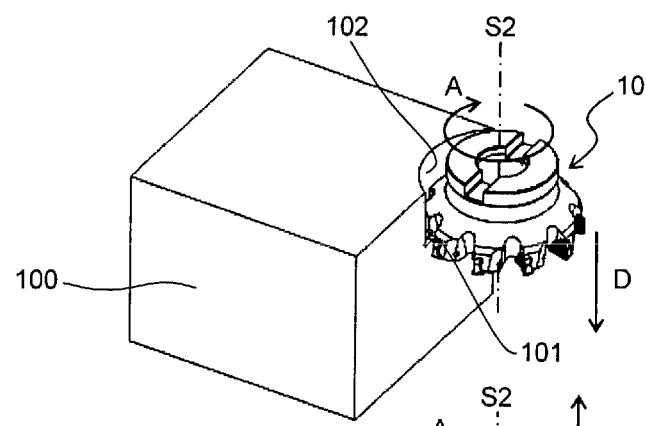

The step (ii) is to bring the upper cutting edge 5 of the cutting tool 10 being rotated into contact with a surface of the workpiece 100 as shown in FIG. 11(b). In the present embodiment, the step (ii) includes the following three sub-steps.

The first substep is to allow the cutting tool 10 being rotated to move in the direction indicated by arrow D that is the direction perpendicular to the rotation axis S2. Thereby, the workpiece 100 can be subjected to the plunge milling process.

The second substep is to bring the second major cutting section 5c of the upper cutting edge 5 extending from the first major corner 21a to the second minor corner 22b adjacent thereto in the cutting tool 10 being rotated, into contact with the surface of the workpiece 100. Consequently, a cutting target surface of the workpiece 100 cut by being brought into contact with the second major cutting section 5c becomes a finished surface 101 as shown in FIG. 11(b).

The third substep is to bring the minor cutting edge 52 of the upper cutting edge 5 located between the first major corner 21a and the second minor corner 22b in the cutting tool 10 being rotated, into contact with the cutting target surface of the workpiece 100 formed by being brought into contact with the second major cutting section 5c. Thereby, a portion of the cutting target surface of the workpiece 100 cut by the second major cutting section 5c in the foregoing second substep, which remains without being directly cut by the second major cutting section 5c, can be smoothed by the minor cutting edge 52, resulting in a finished surface 102 as shown in FIG. 11(b).

Figure 11C:
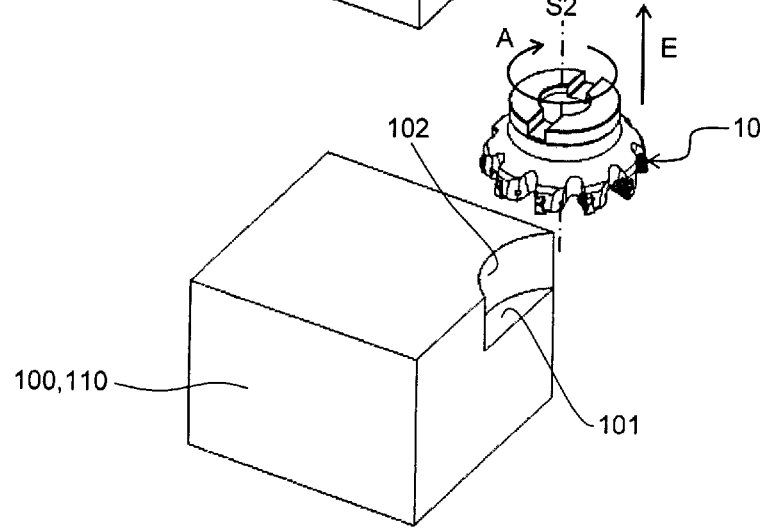

The step (iii) is to separate the cutting tool 10 from the workpiece 100 by moving the cutting tool 10 in the direction indicated by arrow E, as shown in FIG. 11(c).

A machined product 110, which is obtained by cutting the workpiece 100 into the desired shape as shown in FIG. 11(c), is manufactured by being subjected to the foregoing individual steps.

When the cutting process is continuously performed, it is required to perform similarly to the foregoing first embodiment.

While the several embodiments of the present invention have been illustrated and described, it is to be understood that the present invention is not limited to the foregoing embodiments but various changes and modifications can be made therein without departing from the spirit or scope of the present invention.

For example, the upper surface 2 and the lower surface 3 may have different colors though not particularly mentioned in the inserts 1 of the foregoing embodiments. Specifically, for example, when an insert body is made of silver-colored cemented carbide, either the upper surface 2 or the lower surface 3 is preferably coated with gold-colored titanium nitride (TiN). In a negative-type insert, the both the upper surface 2 and the lower surface 3 function as the rake surface, and hence an erroneous attachment of the inserts might occur. By coating either the upper surface 2 or the lower surface 3 with TiN, a surface coated with TiN and an uncoated surface have different colors. It is therefore capable of clearly distinguishing between these two surfaces, thereby reducing misrecognition when attaching the inserts 1. Hereat, a coating target surface of either the upper surface 2 or the lower surface 3 need not be entirely coated. A similar effect is obtainable by coating a part of the coating target surface (for example, a portion other than the cutting edges) with TiN. The material used for the coating is not limited to TiN as long as one can recognize a color difference between the upper surface 2 and the lower surface 3. For example, when the insert body is made of cemented carbide, it is also possible to employ bright reddish brown colored titanium carbonitride (TiCN), dark reddish brown colored titanium aluminum nitride (TiAlN), or the like.

According to the inserts 1 of the foregoing embodiments, the mount part 26 is configured to have the three separated portions 26a located away from one another. Alternatively, the three separated portions 26a may be configured to be connected via a certain portion adjacent to each other as long as a similar effect is obtainable.

The upper cutting edge 5 may be configured to have a land (not shown) substantially parallel to the vertical plane S1b though not particularly mentioned in the inserts 1 of the foregoing embodiments. This configuration improves the strength of the upper cutting edge 5, thus making it possible to suitably use the inserts 1 under machining conditions of so-called heavy-duty cutting.

Although the upper surface 2 of the inserts 1 of the foregoing embodiments has the hexagonal shape, the upper surface 2 may have any polygonal shape other than the hexagonal shape.

The invention claimed is:

1. A cutting insert, comprising:
    a polygonal shaped first surface comprising:
        a first corner having a first interior angle;
        a second corner having a second interior angle larger than the first interior angle; and
        a side located between the first corner and the second corner;
    a second surface;
    a side surface located between the first surface and the second surface and comprising:
        a corner side surface connected to the first corner and having a curved shape; and
        a first side surface connected to the side and having a planar shape; and
    an edge comprising:
        a corner edge located at an intersection of the first surface and the corner side surface;
        a second edge located at an intersection of the first surface and the first side surface and inclined toward the second surface as separating from the corner edge at a first inclination angle on a basis of a vertical plane perpendicular to a central axis extending between the first and second surfaces, and
        a first edge located at an intersection of the first surface and the first side surface and inclined toward the second surface as separating from the second edge at a second inclination angle larger than the first inclination angle on the basis of the vertical plane.

2. The cutting insert according to claim 1, wherein the corner edge is parallel to the vertical plane.

3. The cutting insert according to claim 1, wherein the first edge has a concave shape recessed toward the second surface in a side view.

4. The cutting insert according to claim 1, wherein the second edge has a straight line shape.

5. The cutting insert according to claim 1, wherein the first interior angle is a substantially right angle.

6. The cutting insert according to claim 1, wherein
    the first surface further comprises a rake surface being continuous with the edge and inclined toward the second surface as going inward from the edge at a third inclination angle on the basis of the vertical plane, and
    the rake surface comprises a second rake surface located inward of the second edge, and a first rake surface located inward of the first edge.

7. The cutting insert according to claim 6, wherein an angle formed by the second rake surface and the first rake surface is substantially identical to an angle formed by the second edge and the first edge.

8. The cutting insert according to claim 7, wherein
    the first surface further comprises a third corner having the second interior angle, and
    a boundary of the second rake surface and the first rake surface, located between the first corner and the second corner, has a substantially constant distance from a straight line connecting the first corner and the third corner in a top view.

9. The cutting insert according to claim 7, wherein a boundary of the second rake surface and the first rake surface extends from a edge boundary of the second edge and the first edge in a direction substantially perpendicular to a tangential line at the edge boundary in the top view.

10. The cutting insert according to claim 6, wherein the third inclination angle of the rake surface on the first rake surface and the second rake surface is greater than the third inclination angle of the rake surface on a boundary of the second rake surface and the first rake surface.

11. The cutting insert according to claim 6, wherein a width of the rake surface at a boundary of the second rake surface and the first rake surface is greater than a width of the rake surface at the second rake surface and the first rake surface.

12. The cutting insert according to claim 6, wherein the first surface further comprises a protruded surface being continuous with the rake surface and inclined as going inward from the edge at a fourth inclination angle in a direction to separate from the second surface on the basis of the vertical plane.

13. A cutting tool, comprising:
  a cutting insert according to claim 1; and
  a holder configured to attach the cutting insert thereto.

14. A method of manufacturing a machined product, comprising:
  rotating a cutting tool according to claim 13 on a basis of a rotation axis of the holder;
  bringing the edge of the cutting tool being rotated into contact with a surface of a workpiece; and
  separating the cutting tool from the workpiece.

* * * * *